United States Patent
English

(10) Patent No.: US 8,312,214 B1
(45) Date of Patent: Nov. 13, 2012

(54) SYSTEM AND METHOD FOR PAUSING DISK DRIVES IN AN AGGREGATE

(75) Inventor: Robert English, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1405 days.

(21) Appl. No.: 11/692,589

(22) Filed: Mar. 28, 2007

(51) Int. Cl.
*G06F 1/32* (2006.01)

(52) U.S. Cl. ........ 711/114; 711/111; 711/112; 713/300; 713/320; 713/324

(58) Field of Classification Search .................. 711/111, 711/112, 114; 713/300, 320, 324
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,517,663 A | 5/1985 | Imazeki et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,817,035 A | 3/1989 | Timsit |
| 4,837,675 A | 6/1989 | Bean et al. |
| 4,849,929 A | 7/1989 | Timsit |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,088,081 A | 2/1992 | Farr |
| 5,124,987 A | 6/1992 | Milligan et al. |
| RE34,100 E | 10/1992 | Hartness |
| 5,155,835 A | 10/1992 | Belsan et al. |
| 5,163,131 A | 11/1992 | Row et al. |
| 5,274,799 A | 12/1993 | Brant et al. |
| 5,355,453 A | 10/1994 | Row et al. |
| 5,426,747 A | 6/1995 | Weinreb et al. |
| 5,568,629 A | 10/1996 | Gentry et al. |
| 5,581,724 A | 12/1996 | Belsan et al. |
| 5,802,366 A | 9/1998 | Row et al. |
| 5,819,292 A | 10/1998 | Hitz et al. |
| 5,828,876 A | 10/1998 | Fish et al. |
| 5,931,918 A | 8/1999 | Row et al. |
| 5,944,789 A | 8/1999 | Tzelnic et al. |
| 5,948,110 A | 9/1999 | Hitz et al. |
| 5,963,962 A | 10/1999 | Hitz et al. |
| 5,987,477 A | 11/1999 | Schmuck et al. |

(Continued)

FOREIGN PATENT DOCUMENTS

WO    WO 89/10594    11/1989

(Continued)

OTHER PUBLICATIONS

U.S. Appl. No. 11/692,589, filed Mar. 2007, English.

(Continued)

*Primary Examiner* — Tuan Thai
*Assistant Examiner* — Samuel Dillon
(74) *Attorney, Agent, or Firm* — Cesari and McKenna, LLP

(57) ABSTRACT

The present invention provides a system, method, and computer program product for "cooling" selected disks in a set of disks connected to a storage system by reducing access frequency to the selected disks and pausing the disks with the reduced access frequency. Pausing some disks advantageously reduces power consumption by the disks.

23 Claims, 8 Drawing Sheets

U.S. PATENT DOCUMENTS

| | | | |
|---|---|---|---|
| 6,032,224 A | 2/2000 | Blumenau | |
| 6,131,252 A | 10/2000 | Hoheisel et al. | |
| 6,185,655 B1 | 2/2001 | Peping | |
| 6,192,481 B1 * | 2/2001 | Deenadhayalan et al. | 713/324 |
| 6,289,356 B1 | 9/2001 | Hitz et al. | |
| 6,314,503 B1 | 11/2001 | D'errico et al. | |
| 6,324,620 B1 | 11/2001 | Christenson et al. | |
| 6,457,021 B1 | 9/2002 | Berkowitz et al. | |
| 6,516,380 B2 | 2/2003 | Kenchammana-Hoskote et al. | |
| 6,636,879 B1 | 10/2003 | Doucette et al. | |
| 6,643,654 B1 | 11/2003 | Patel et al. | |
| 6,795,904 B1 | 9/2004 | Kamvysselis | |
| 6,865,650 B1 | 3/2005 | Morley et al. | |
| 7,035,972 B2 | 4/2006 | Guha et al. | |
| 7,194,597 B2 | 3/2007 | Willis et al. | |
| 7,263,590 B1 | 8/2007 | Todd et al. | |
| 7,281,108 B2 | 10/2007 | Todd et al. | |
| 7,406,365 B2 * | 7/2008 | Pratt et al. | 700/295 |
| 7,409,494 B2 | 8/2008 | Edwards et al. | |
| 2002/0103969 A1 | 8/2002 | Koizumi et al. | |
| 2002/0124137 A1 | 9/2002 | Ulrich et al. | |
| 2003/0056058 A1 | 3/2003 | Veitch | |
| 2003/0212872 A1 | 11/2003 | Patterson et al. | |
| 2004/0030668 A1 | 2/2004 | Pawlowski et al. | |
| 2004/0139167 A1 | 7/2004 | Edsall et al. | |
| 2004/0172503 A1 | 9/2004 | Merchant | |
| 2004/0193397 A1 * | 9/2004 | Lumb et al. | 703/24 |
| 2004/0210724 A1 | 10/2004 | Koning et al. | |
| 2005/0240742 A1 | 10/2005 | Eng et al. | |
| 2006/0004957 A1 | 1/2006 | Hand et al. | |
| 2006/0031287 A1 | 2/2006 | Ulrich et al. | |
| 2006/0112242 A1 | 5/2006 | McBride et al. | |
| 2006/0206675 A1 | 9/2006 | Sato et al. | |
| 2006/0259686 A1 | 11/2006 | Sonobe | |
| 2007/0088702 A1 | 4/2007 | Fridella et al. | |
| 2007/0168633 A1 | 7/2007 | English et al. | |
| 2007/0255897 A1 | 11/2007 | McNutt | |
| 2007/0288712 A1 | 12/2007 | Zimoto et al. | |
| 2008/0263259 A1 | 10/2008 | Sadovsky et al. | |
| 2008/0270706 A1 | 10/2008 | Fair et al. | |

FOREIGN PATENT DOCUMENTS

| | | |
|---|---|---|
| WO | WO 02/093298 | 11/2002 |
| WO | WO 06/055765 | 5/2006 |
| WO | PCT/US2005/041794 | 7/2006 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Callaghan, B., "NFS Version 3 Protocol Specification", Request for Comments (RFC) 1813 Jun. 1995, 118 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., Synchronization and Caching Issues in the Andrew File System, Carnegie Mellon University, CMU-ITC88-063, 12 pages, 1988.

Miller, Ethan L., et al., RAMA: A File System for Massively Parallel Computers, 12.sup.th IEEE Symposium on Mass Storage Systems, Monterey CA, Apr. 1993, pp. 163-168.

Nelson, Michael et al., "Caching in the Sprite Network File System", ACM, Nov. 1987, pp. 3-4.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Satyanarayanan, M., et al., Coda: A highly available file system for a distributed workstation environment Carnegie Mellon University, CMU-ITC, 1990, 5 pages.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Weikum, Gerhard, et al., Towards Self-Tuning Memory Management for Data Servers, Data Engineering Journal 22, Feb. 1999 pp. 3-11.

\* cited by examiner

SYSTEM AND METHOD FOR PAUSING DISK DRIVES IN AN AGGREGATE

FIELD OF THE INVENTION

The present invention pertains to storage systems, and more particularly, to pausing mass storage devices, such as disk drives, to reduce power consumption by the disk drives.

BACKGROUND

A storage system is a processing system adapted to store and retrieve data on behalf of one or more client processing systems ("clients") in response to external input/output (I/O) requests received from clients. A storage system can provide clients with a file-level and/or a block-level access to data stored in a set of mass storage devices, such as magnetic or optical storage disks.

A hard disk drive (HDD) or a disk is a digitally encoded non-volatile storage device, which stores data on rapidly rotating platters with magnetic surfaces. A spindle is a motor responsible for turning the platters, allowing the hard disk drive to operate. Each disk requires energy to rotate a spindle and move platters. For disk drives, electrical power consumption currently contributes to 20% of the total cost of ownership of a data center. As the number of disks in the storage system increases, the amount of energy required to operate the storage system increases. Over the past years, storage capacity of a typical storage system has risen from 3 terabyte (TB) to 50 TB in size. This increasing need for data represents a rising power usage.

Accordingly, what is needed is a mechanism for reducing power consumption in a storage system.

SUMMARY OF THE INVENTION

The present invention provides a system, method, and computer program product for "cooling" selected disks in a set of disks connected to a storage system by reducing access frequency to the selected disks and pausing the disks with the reduced access frequency. Pausing some disks advantageously reduces power consumption by the disks.

According to one embodiment, a storage system executes a disk monitoring process, a disk cooling process, and a process for causing the disks to pause. A disk can be any storage device that consumes power. The monitoring process periodically computes average latency across the set of disks. Latency is the time it takes for a disk to satisfy a request. The "average latency" is calculated over a number of requests to disks.

The monitoring process determines the number of disks to "cool" based on the access frequency rate of the disks, the average latency, and a target latency (i.e., a maximum threshold of average latency desirable for the storage system to maintain). A disk's "access frequency rate" is the inverse of the time to retrieve data, not including time spent in a service queue. The monitoring process requests a disk management system of the storage system to select disks to "cool" and maintains those disks in the cooling state as long as the average latency does not exceed the target latency.

A disk cooling process performs "cooling" of the disks selected by the disk management system. When data blocks from a "cooling" disk are accessed and stored in the storage system, the disk cooling process provides an indication that the retrieved data should be stored at new on-disk locations. In addition, the disk cooling process reduces access frequency to the cooling disks by preventing write requests going to the cooling disks. To this end, the disk cooling process prevents an identifier (ID) of a cooling disk from being returned to a write allocation process in response to its request to allocate space on the disks.

The write allocation process identifies data in a buffer cache that have been chosen for storage at new on-disk locations and writes the data at new on-disk locations. According to the present invention, data can be written as a result of the storage system servicing read requests initiated externally by clients requesting services of the storage system. In an alternative embodiment, data can be written to new locations independently of client-initiated read operations, such as during a background scan process and/or during the course of other internally-initiated read operations.

As the disks continue to be cooled, the disk management system determines whether it is economically desirable to pause the cooling disks, i.e., to remove power from a spindle of the disk so that platters storing data cannot be accessed on the disk. In one implementation to determine whether it is economically desirable to pause the cooling disk, the disk cooling process compares a disk access frequency for the cooling disk to the lower of two parameters—a spin down rate for the disk and a target latency. A "spin down rate" is a parameter indicating for a particular type of disk the maximum access frequency for which pausing the disk is economically desirable. If the disk access frequency is higher than the spin down rate, then pausing and resuming the disk would occur so frequently that energy consumption required to restart the disk would exceed the amount of energy saved as a result of pausing the disk. Under these circumstances, pausing the disk is not economically desirable.

If the access frequency for a disk is below the lower of the two parameters, the disk cooling process requests the disk management system to cause the disk to pause by issuing a command to the disk.

A process for pausing the disks involves execution of a pause command at the disk. As a result, a spindle of the disk stops rotating and the disk thereafter does not consume power. When a disk is paused, commands that require accessing data on the disk, such as "read" and "write" commands are not executed.

When a read request directed to a disk that has been paused arrives, the storage system sends a command to the disk to restart the disk so that the request can be served. As the storage system continues operating with a fewer number of disks, disks continue to be cooled until average latency exceeds the target latency. At that point, some paused disks are restarted, e.g., power is provided to a spindle on the disk so that platters can be accessed on the disk.

If the current average latency still remains above the target latency after all the disks have been restarted, the storage system re-enables write requests going to the cooling disks. Over time, this increases the number of requests going to these disks, decreases the number of requests to the remaining disks, and reduces overall latency across the set of disks.

A person of ordinary skill in the art would understand that although the present invention is described in the context of pausing the disks with low access frequency, the underlying mechanism for reducing the disks' access frequency and pausing the disks having the reduced access frequency can be utilized with any other desirable policies. For example, disks could be paused based on their access failure rate and/or other parameters.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
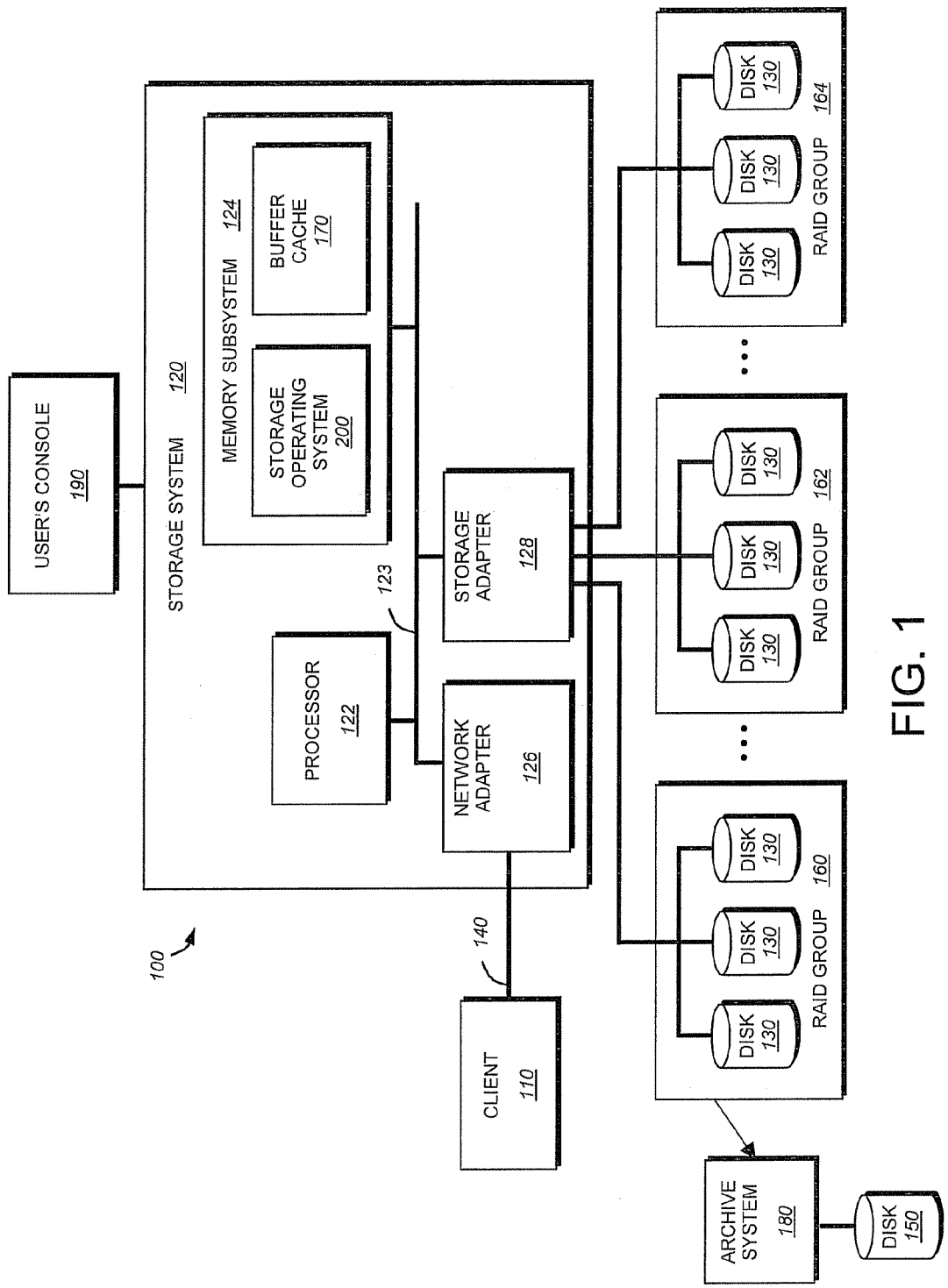
FIG. 1 shows network environment that includes a storage system according to an embodiment of the present invention.

The present invention provides a system, method, and computer program product for reducing the load (e.g., disk access requirements) on some disks in the aggregate by copying data blocks accessed on those disks to other disks in the aggregate. These disks are then caused to be paused. Pausing selected disks in the aggregate advantageously reduces power consumption by the aggregate. An "aggregate" is a logical container for a pool of storage, which combines one or more physical mass storage devices (e.g., disks) or parts thereof into a single logical storage object, which contains or provides storage for one or more other logical data sets (e.g., volumes), but at a higher level of abstraction. A "volume" is a set of stored data associated with a collection of mass storage devices, such as disks, which obtains its storage from (i.e., is contained within) an aggregate, and which is managed as an independent administrative unit.

Disks can be selected to be paused based on any policy selected by a user or by an external policy engine monitoring performance of a storage system. According to an embodiment of the present invention, disks can be paused based on their frequency of access. A person of ordinary skill in the art would understand that disks can be paused based on other parameters, such as an access failure, and/or other parameters.

As the storage system reduces the load on selected disks (cools them), this concentrates load on the disks to which data blocks are copied and as a result, increases average latency in the aggregate. As long as the average latency of the aggregate remains below the target latency (provided by a user or by an external system) the process continues. If the aggregate latency rises above target latency, the process halts and the system begins restarting the disks. If the aggregate latency still remains above the target latency after all the disks in the aggregate have been restarted, the storage system re-enables write requests going to the previously write-suppressed disks by allocating data blocks to those disks. Over time, this increases the load on these disks, decreases the load on the remaining disks, and reduces overall latency in the aggregate.

As used herein, "pausing the disk" means removing power from a spindle of a disk (e.g., a motor responsible for turning the platters on the disk, allowing the disk to operate) so that platters storing data cannot be accessed on a disk. "Restarting the disk" means providing power to a spindle of the disk so that platters can be accessed on a disk.

As described herein, "latency" represents a period of time during which a disk satisfies a request, which includes both the time for a disk to retrieve data and the time a request waits in a service queue. An "average latency" in the aggregate is calculated over a number of requests to disks and is determined based on the most recently measured latency and a previous average latency. Target latency is a maximum latency that is desirable for an aggregate to maintain. The target latency may be provided by a user via a user's console using, for example, a command line interface (CLI).

A "data block", as the term is used herein is a contiguous set of data of a known length starting at a particular offset value. In certain embodiments of the invention, blocks contain 4 Kbytes of data and/or metadata. In other embodiments, blocks can be of a different size.

1. System Environment

FIG. 1 is a schematic block diagram of a storage system 120 according to an embodiment of the present invention. The storage system 120 is configured to provide storage service to clients, such as client 110, with a file-level access to data stored in a set of mass storage devices, such as magnetic or optical storage disks or tapes. Alternatively, a storage system can provide clients with a block-level access to stored data, rather than file-level access, or with both file-level access and block-level access.

The storage system 120 is illustratively embodied as a system comprising a processor 122, a memory 124, a network adapter 126, and a storage adapter 128 interconnected by a system bus 123. The storage system 120 also includes a storage operating system 200 that includes a file system (such as file system 280 shown in FIG. 2) to logically organize the information as a hierarchical structure of named directories, file and virtual disk (vdisk) storage objects on disk drives 130 (also referred to herein as "disks").

Whereas clients of a NAS-based network environment have a storage viewpoint of files, the clients of a SAN-based network environment have a storage viewpoint of blocks or disks. To that end, the storage system 120 presents (exports) disks to SAN clients through the creation of logical unit numbers (luns) or vdisk objects.

In the illustrative embodiment, the memory 124 comprises storage locations that are addressable by the processor 122 and adapters 126 and 128 for storing software program code, such as storage operating system 200, and data structures. According to an embodiment of the present invention, memory 124 stores various parameters, such as target latency and current average latency. As will be described in greater detail herein, the target latency is periodically, e.g., from time to time, compared to current average latency. If the current average latency is below the target latency, then selected disks are caused to "cool" so that load on those disks is reduced. In one embodiment, the load is reduced as a result of copying data blocks accessed on those disks to other disks in the aggregate.

A portion of the memory 124 may be further organized as a "buffer cache" 170 for storing certain data structures associated with the present invention as well as data blocks retrieved from disks 130. The processor 122 and adapters 126 and 128 may comprise processing elements and/or logic circuitry configured to execute the software code and manipulate the data structures. The storage operating system 200, portions of which are typically resident in memory 124, functionally organizes the storage system 120 by, inter alia, invoking storage operations in support of the storage service implemented by the storage system 120.

The network adapter 126 couples the storage system 120 to a client 110 over point-to-point links, wide area networks (WAN), virtual private networks implemented over a public network (Internet) or a shared local area network, hereinafter referred to as an illustrative network 140. For a NAS-based network environment, the client 110 is configured to access information stored on the storage system 120 as files. Therefore, the network adapter 126 may comprise a network interface card (NIC) having the mechanical, electrical and signaling circuitry needed to connect the storage system 120 to a network switch, such as a conventional Ethernet switch. The client 110 communicates with the storage system 120 over network 140 by exchanging discrete frames or packets of data according to pre-defined protocols, such as the Transmission Control Protocol/Internet Protocol (TCP/IP).

The client 110 may be a general-purpose computer configured to execute applications over a variety of operating systems, including the UNIX® and Microsoft® Windows™ operating systems. A person of ordinary skill in the art would understand that although one client 110 is shown in FIG. 1, any number of clients 110 can be connected to storage system 120. Clients generally utilize file-based access protocols when accessing information (in the form of files and directories) over a NAS-based network. Therefore, client 110 may request the services of the storage system 120 by issuing file access protocol messages (in the form of packets) to the storage system 120 over the network 140. For example, client 110 running the Windows operating system may communicate with the storage system 120 using the Common Internet File System (CIFS) protocol over TCP/IP. On the other hand, if client 110 runs the UNIX operating system, it may communicate with the multi-protocol storage system 120 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage system 120 using other file access protocols.

Client 110 may be further configured to access the stored information as blocks or disks. For this SAN-based network environment, network 140 maybe Fibre Channel (FC) network. FC is a networking standard describing a suite of protocols and media that is primarily found in SAN deployments. The client 110 generally utilizes block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as the disk drives 130, to attach to the storage system 120.

The storage adapter 128 cooperates with the storage operating system 200 executing on the storage system 120 to access information requested by the clients 110. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter 128 and, if necessary, processed by the processor 122 (or the adapter 128) prior to being forwarded over the system bus 123 to the network adapter 126, where the information is formatted into packets or messages and returned to the clients 110.

Storage of information on the storage system 120 is preferably implemented as one or more storage volumes comprising physical storage disk drives 130 defining an overall logical arrangement of disk space. The disks within a volume are typically organized as one or more RAID groups, e.g., RAID groups 160, 162, and 164 as shown in FIG. 1. The physical disks of each RAID group include those disks configured to store striped data (D) and those configured to store parity (P) for the data, in accordance with a RAID-4 level configuration. However, other RAID level configurations (e.g., RAID-5 and RAID-DP) are also contemplated. In the illustrative embodiment, a minimum of one parity disk and one data disk may be employed. However, a typical implementation may include three data disks and one parity disk per RAID group and at least one RAID group per volume.

Storage system 120 can be connected to a user console 190, such as a monitor with a keyboard. A user can provision storage space on disks 130 via user console 190. To provision storage space, a user takes into consideration various factors, such as a schedule according to which data will be backed up on disk(s) 130, the retention plan (i.e., how long the data are going to be maintained), whether the data are going to be mirrored, and how often the data on disk(s) is going to change. According to an embodiment of the present invention, a user may enter various parameters to storage system 120, such as target latency for the aggregate.

As described herein, increased storage demands lead to significant power consumption. The present invention addresses this problem by providing a mechanism for reducing the access frequency of some disks within an aggregate to the point where they can be paused without causing a large increase in average latency. Pausing disks in the aggregate advantageously reduces power consumption by the storage system.

2. Storage Operating System

Figure 2:
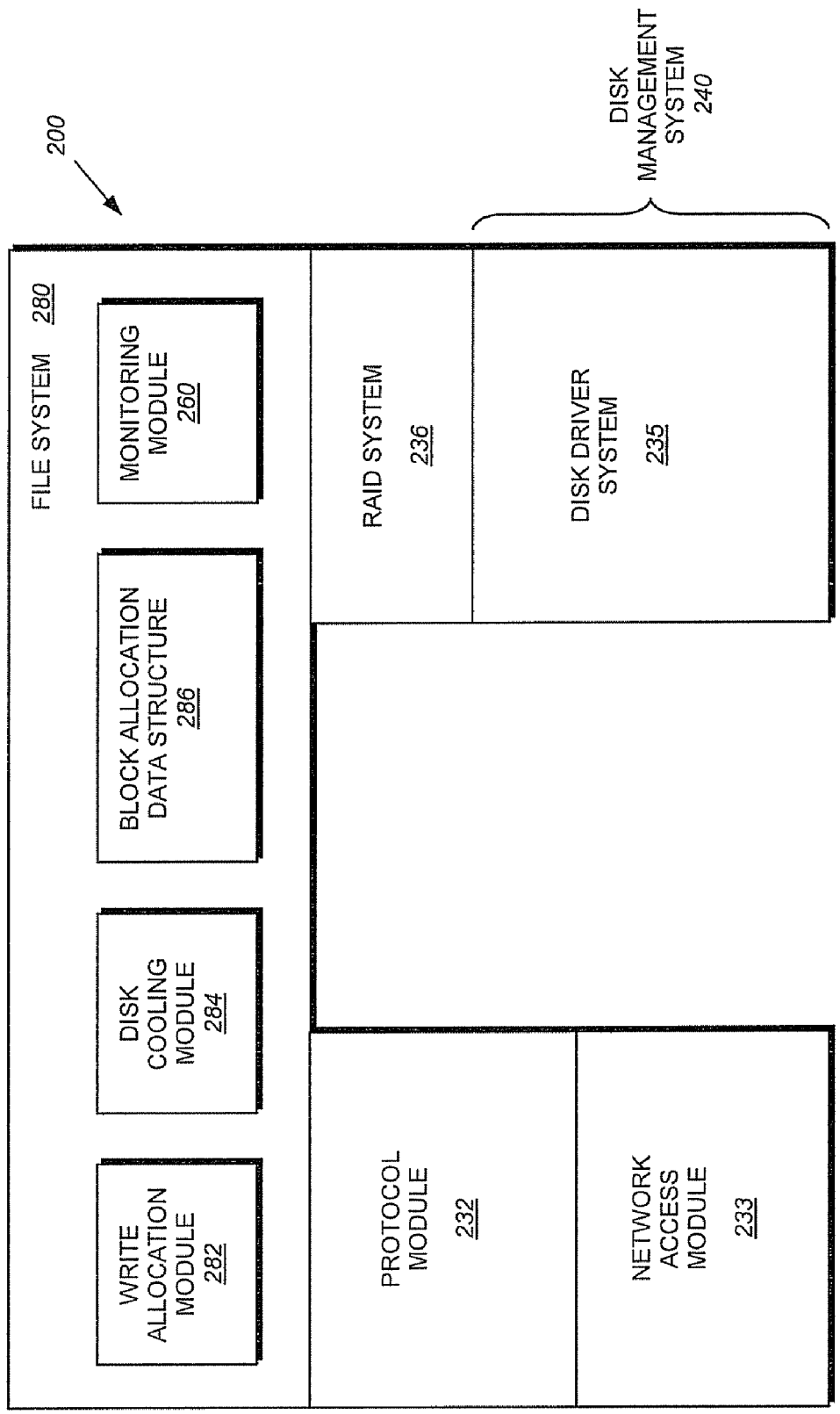
FIG. 2 is a diagram showing storage operating system of the storage system of FIG. 1 according to an embodiment of the present invention.

Referring now to FIG. 2, it illustrates various components of the storage operating system shown in FIG. 1. In the illustrative embodiment, the storage operating system 200 is preferably the NetApp® Data ONTAP™ operating system available from Network Appliance Inc., of Sunnyvale, Calif., that implements a Write Anywhere File Layout (WAFL™) file system. However, it is expressly contemplated that any appropriate file system, including a write in-place file system, may be enhanced for use in accordance with the inventive principles described herein to facilitate access to disk drives 130. As such, where the term "WAFL" is employed, it should be taken broadly to refer to any file system that is otherwise adaptable to the teachings of this invention. As used herein, the term "storage operating system" generally refers to the computer-executable code operable on a computer that manages data access. The storage operating system can be implemented as an application program operating over a general-purpose operating system, such as UNIX® or Windows NT®, or as a general-purpose operating system with configurable functionality, which is configured for storage applications as described herein.

The file system 280 "virtualizes" the storage space provided by the disk drives 130. The file system 280 logically organizes the information as a hierarchical structure of name directories and file objects (hereinafter "directories" and "files") on the disks. Each "on-disk" file may be implemented as a set of disk blocks configured to store information, such as data, whereas the directory may be implemented as a specially formatted file in which names and links to other files and directories are stored.

Figure 6:
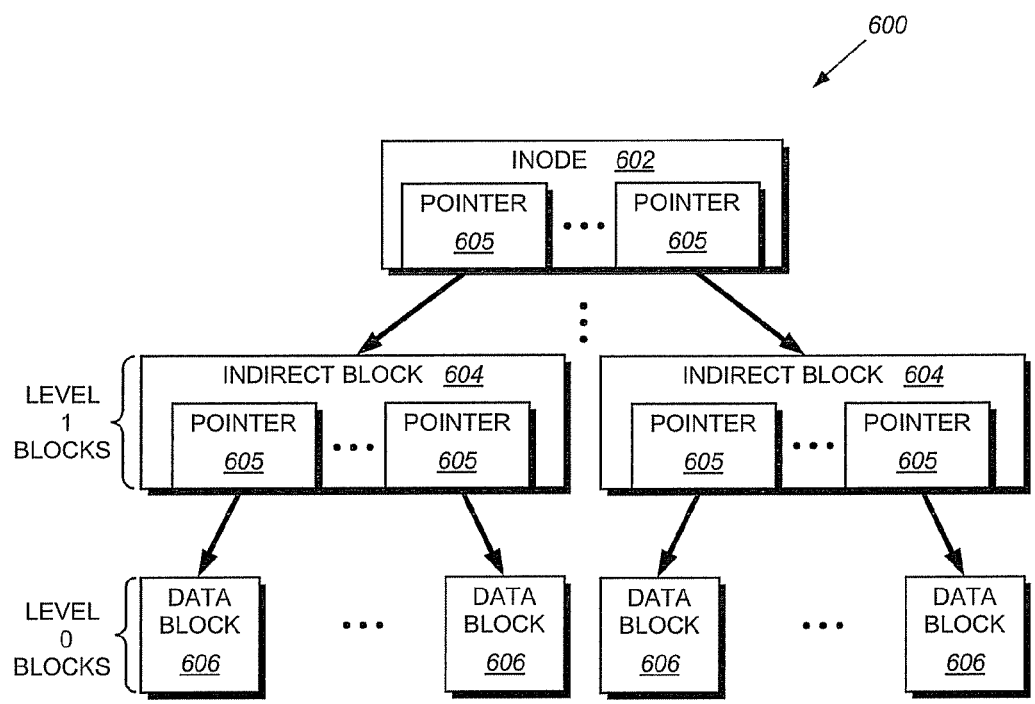
FIG. 6 is a diagram of a buffer tree according to an embodiment of the present invention.

File system 280 maintains various hierarchical data structures, called buffer trees, to keep track of the organization of blocks stored in the aggregate (an exemplary buffer tree and its structure are shown in FIG. 6). A buffer tree may represent, for example, a volume defined within an aggregate or a file defined within a volume. For any particular file, there are generally two relevant buffer trees, namely a container file buffer tree (hereinafter "container buffer tree") and a user file buffer tree (hereinafter "user buffer tree"). The user buffer tree represents the particular file, while the container buffer tree represents the volume which contains the file. Normally, the user buffer tree is used to locate blocks in a file in response to a client-initiated read or write request.

Referring now to FIG. 6, a user buffer tree 600 is shown. The buffer tree includes data blocks. Some of these blocks contain actual data—these are referred to as "direct blocks" (e.g., data blocks 606). Some blocks in a buffer tree simply contain pointers to other blocks—these are referred to as "indirect blocks" (e.g., indirect blocks 604). There can be multiple levels of indirect blocks in a buffer tree (one level of indirect blocks, Level 1, is shown for simplicity only). There is one level (Level 0) of direct blocks, which is the lowest level of the buffer tree. In the illustrative embodiment, a file is represented in the write-anywhere file system as an mode data structure adapted for storage on the disks 130. A person of ordinary skill in the art would understand that any multi-disk file system can be used with the present invention. The root of the buffer tree is known as an "mode" (602), which is a metadata structure that contains metadata about the file. The information stored in the metadata section of each mode describes the file and, as such, includes the type (e.g., regular, directory, virtual disk) of file, the size of the file, time stamps (e.g., access and/or modification) for the file and ownership, i.e., user identifier and group ID, of the file.

The data section of a regular on-disk mode may include file system data or pointers, the latter referencing, e.g., 4 k bytes (kB) data blocks on disk used to store the file system data. An mode and indirect block in the user buffer tree shown in FIG. 6 includes a pair of associated pointers (e.g., pointers 605) for a lower level block that it references, namely, a Physical Volume Block Number in an aggregate (PVBN) and a Virtual Volume Block Number (VVBN). The VVBN is an address of the block in the volume. Every mode and indirect block in the container buffer tree also includes PVBN for every lower level block that it references.

When accessing a data block in response to servicing an external client read request, the file system 280 specifies VVBN that is translated at the file system 280 into a PVBN location on a particular disk within a RAID group of the physical volume. Each block in the VVBN space and in the PVBN space is typically fixed, e.g., 4 kB, in size. The disk location specified by the RAID system 236 is further translated by the disk driver system 235 of the storage operating system 200 into a plurality of sectors (e.g., a 4 kB block which a RAID header translates to 8 or 9 disk sectors of 512 or 520 bytes) on the specified disk so that the data block will be written to a disk at the next consistency point. A consistency point is the recurring event at which any new or modified data that has been temporarily cached in the storage system's buffer cache 170 is committed to long-term storage (e.g., disks). A consistency point typically occurs periodically, i.e., from time to time (e.g., every 10 seconds) or in response to a predetermined condition occurring (e.g., a specified percentage of memory is full of "dirty" data). A retrieved data block may be loaded from disk 130 into the buffer cache 170. When a data block is loaded from disk 130 into buffer cache 170, its corresponding in-core structure embeds the on-disk structure.

The in-core structure is a block of memory that stores the on-disk structure plus additional information needed to manage data in the memory. Additional information may include, e.g., a "dirty" bit. After data in the mode (or block) is updated or modified as instructed by, e.g., a write operation, the modified data are marked "dirty" using the dirty bit so that the mode (block) can be subsequently "flushed" (stored) to disk.

Referring again to FIG. 2, the file system 280 also includes a monitoring module 260 and a disk cooling module 284. Monitoring module 260 is configured to compute average latency across an aggregate. Monitoring module 260 also periodically compares the average latency to the target latency and causes reduction of access frequency of some of the disks within an aggregate to the point where they can be paused without causing a large increase in average latency. Monitoring module 260 determines how many disks to cool and requests a disk management system 240 to select disks for cooling.

The disk cooling module 284 reduces access frequency to the disks selected for cooling and prevents write requests from going to these disks. When disk management system 240 selects disks for cooling, disk cooling module 284 provides an indication in a disk data structure (not shown) that a disk is in a cooling mode (i.e., data blocks from that disk are copied to other disks). For example, during an access operation, disk cooling module 284 sets a flag next to the data block retrieved from the cooling disk to indicate that the data block is to be written to a new location.

File system 280 further includes a write allocation module 282 configured to allocate free blocks on a disk to store data. As used herein, data blocks that are currently occupied by any data or metadata are called "allocated data blocks." Data blocks that are not occupied by any data or metadata are called "free data blocks" or "unallocated data blocks." Write allocation module 282 goes through the data blocks in the buffer cache 170 and identifies data blocks having a flag set next to them. Write allocation module 282 then writes these data blocks to new on-disk locations. According to an embodiment of the present invention, a cooling disk is prevented from being returned to the write allocation module 282 when write allocation module 282 requests that a disk be provided to allocate data blocks. The write allocation module 282 uses a block allocation data structure, such as for example, block allocation data structure 286, to select free data blocks within its VVBN space to which to write new data. In one embodiment, data structure 286 is implemented as a bitmap in which a value of "1" may indicate that a data block is allocated and a value of "0" (zero) may indicate that a data block is not allocated. A person of ordinary skill in the art would understand that other values may indicate whether a particular data block is allocated.

The disk management system 240 of the storage operating system 200 includes RAID system 236 and disk driver system 235. According to an embodiment of the present invention, disk management system 240 selects disks for cooling in response to a request received from monitoring module 260. In one implementation, disk management system 240 chooses a disk(s) to cool based on a disk access frequency.

RAID system 236 (also referred to herein as a "storage module") manages the storage and retrieval of the information to and from the disks in accordance with input/output (I/O) operations. The RAID system 236 is also responsible for parity operations in the storage system 120. RAID system 236 maintains data structures for each RAID group (these data structures are not shown in FIG. 3). A data structure for a RAID group points to one or more disk data structures that identify disks included in the RAID group. A disk data structure (not shown in FIG. 3) may include a type of a disk, the disk's serial number, the disk's location, the disk's size, and a handle to identify the disk that is used when sending requests to disk driver system 235.

In one embodiment, RAID system 236 can be a software module executed on the storage system 120. In an alternative embodiment, RAID system 236 can be a separate controller implemented as hardware. RAID system 236 may implement various protocols, such as, for example, RAID-4, RAID-5, or RAID-DP.

Disk driver system 235 allows storage system 120 to communicate with the disks 130. The disk driver system 235 may implement a lower-level storage device access protocol, such as Fibre Channel Protocol (FCP) or SCSI. Disk driver system 235 monitors individual disk utilization, an access frequency rate of individual disks, as well as different types of errors received from the disks. Such errors are conventionally generated as provided by disk drives' manufacturers. Further, the monitored information may include a number of read and write requests received by each of the selected disks, the amount of data read from each of the selected disk, and the amount of data written to each of the selected disk. Disk driver system 235 may also keep information about power consumed by the selected disks. The monitored data may be kept in data structures (not shown in FIG. 2) in memory 124 of the storage system 120.

According to an embodiment of the present invention, disk driver system 235 is further configured to pause cooling disks and to restart the disks. As described herein, "pausing" the disk means sending a command by the disk driver system 235 to a disk to remove power from a spindle of the disk so that platters storing data cannot be accessed on a disk. "Restarting" the disk means sending a command to a disk to provide power to a spindle of the disk so that platters can be accessed on that disk.

The choice of a command sent to a disk depends on the type of the disk. Commands may be sent, for example, using the FC protocol and Advanced Technology Attachment (ATA) protocol depending on the type of the disk. As a result of pausing a disk, read and write requests to that disk are aborted. As will be described in greater detail herein, according to one embodiment of the present invention, prior to pausing a disk, disk driver system 235 performs a cost-effectiveness analysis to determine whether pausing the disk would save energy. To this end, in one implementation, access frequency for a cooling disk is compared to the lower of the two parameters: a spin down rate and target latency. A spin down rate is a parameter provided by a disk manufacturer indicating the maximum access frequency at which pausing the disk is economically desirable. The target latency is a parameter indicating latency that is desirable for the aggregate to maintain. In another implementation, access frequency for a cooling disk is compared to a spin down rate to determine whether it is economically desirable to pause the disks to reduce power consumption. If the disk access frequency is higher than the spin down rate, then pausing and resuming the disk would occur so frequently that energy consumption required to restart the disk would exceed the amount of energy saved as a result of pausing the disk. Under these circumstances, pausing the disk is not economically desirable.

Storage operating system 200 further includes the protocol module 232 configured to decode incoming client requests or encode outgoing response to the client requests in the appropriate protocol. Protocol module 232 implements one or more of various high-level network protocols, such as Network File System (NFS), Common Internet File System (CIFS), Hypertext Transfer Protocol (HTTP) and/or Transmission Control Protocol/Internet Protocol (TCP/IP).

The network access module 233 includes one or more drivers which implement one or more lower-level protocols to communicate over the network, such as Ethernet. The protocol module 232 and the associated network access module 233 allow the storage system 120 to communicate with client 110.

3. Methods of Operation

A. Monitoring Process

Figure 3A:
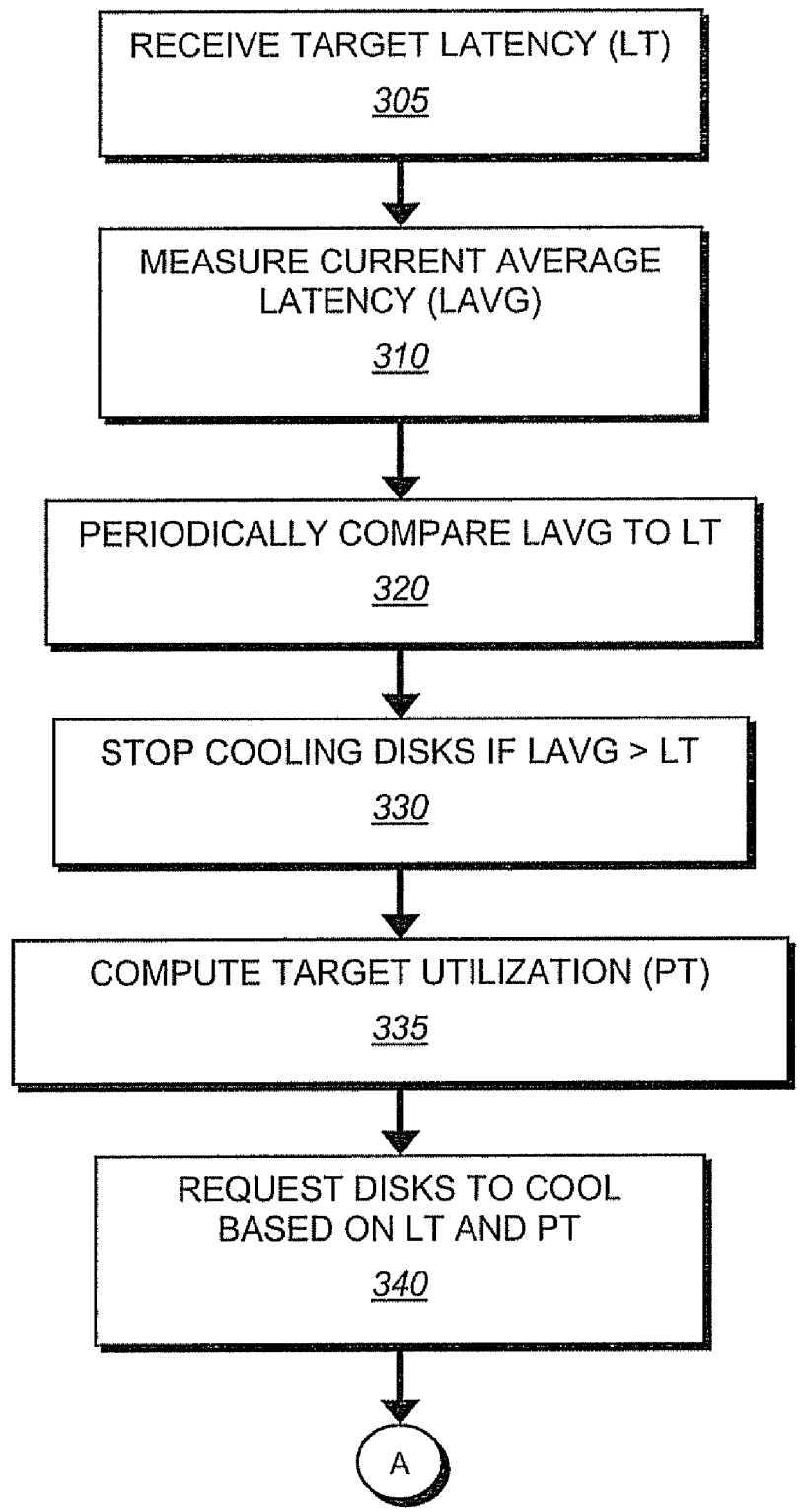
FIG. 3A is a flow diagram of the steps performed by a monitoring module according to an embodiment of the present invention.

Monitoring module 260 periodically monitors performance of disks in an aggregate and determines how many disks to cool based on disks' performance. Referring now to FIG. 3A, at some point, a user enters, via user console 190, target latency ($L_T$). Alternatively, the target latency can be provided by an external agent (not shown in FIGS. 1-6). The target latency is a maximum threshold of average latency desirable for the aggregate to maintain. The target latency may be expressed, for example, in milliseconds (ms). Monitoring module 260 receives $L_T$, at step 305. Monitoring module 260 periodically computes (at step 310) a decaying average latency $L_{current\ avg}$ over the last N requests using the following equation:

$$L_{current\ avg} = Lr/N + L_{avg\ previous}(N-1)/N,$$

wherein Lr is the time during which the last request was served. Lr can be obtained by disk driver system 235 and provided to monitoring module 260. N is the number of requests over the period of time during which $L_{current\ avg}$ is evaluated, and $L_{avg\ previous}$ is the previous average estimate. The number of requests over which average latency is calculated can be provided by a user or by an external system. Alternatively, average latency can be calculated over a predetermined time interval.

For example, if 10 is the number of requests over which latency is evaluated, $L_{avg\ previous}=4$ ms, and Lr=5 ms, $L_{current\ avg}$ can be determined as follows:

$$L_{current\ avg} = 5/10 + 4(10-1)/10 = 0.5 + 3.6 = 4.1\ ms$$

Monitoring module 260 periodically compares (at step 320) $L_{current\ avg}$ with $L_T$. If $L_{current\ avg}$ exceeds the target latency, it indicates that as a result of cooling the disks, the current load of requests cannot be handled by a fewer number of disks without exceeding the target latency. As a result, monitoring module 260 stops cooling the disks (step 330) (the details of the process for cooling the disks is described herein in a "Disk Cooling Process" section of this disclosure).

Monitoring module 260 periodically computes (at step 335) target utilization, $P_T$ based on the target latency $L_T$, current utilization $P_{current}$, and current average latency $L_{current\ avg}$ to determine the number of disks in the storage system 120 that need to remain active (e.g., able to satisfy the current load). Current utilization for the set of disks $P_{current}$ is computed by monitoring module 260 using utilization of each disk (provided by disk management system 240). Current utilization ($P_{current}$) fraction (P represents a action of time disks in set of disks are servicing client requests averaged over the number of disks in the set of disks. Thus, if there are 5 disks, and utilization of each disk is as follows: 50%, 75%, 25%, 25%, and 75%, current utilization is equal 50%.

Once current utilization $P_{current}$ is determined, target utilization $P_T$ can be computed using the following equation:

$$P_T = 1 - L_{current\ avg}(1-P_{current})/L_T.$$

For example, if current utilization, $P_{current}=50\%$, $L_{current\ avg}=5$ ms, and $L_T=10$ ms, target utilization can be determined as follows:

$$P_T = 1 - 5*(1-50\%)/10\ ms = 1 - 25\% = 75\%.$$

In another embodiment, a value for target utilization can be provided to the storage system via the user console (shown in FIG. 1).

Using the target utilization and current utilization, monitoring module 260 can determine the number of active disks $D_T$ (e.g., disks capable of serving requests) that the storage system 120 needs. To this end, the following equation can be used:

$$D_T = D_{current} * P_{current}/P_T;$$

wherein $D_{current}$ represents the number of disks that are currently active.

Thus, if $D_{current}=10$, $P_{current}=50\%$ and $P_T=75\%$, $D_T=10 * 0.5/0.75=6.6$. This indicates that the target number of disks in the system that have to be active is 7. $D_T$ can be used to determine the number of disks (Dc) that can be selected for cooling as follows:

$$DC = D_{current} - D_T.$$

If $D_{current}=10$, Dc=10−7=3.

At step 340, monitoring module 260 requests disk management system 240 to select a number of disks Dc to cool based on the disks' access frequency. A person of ordinary skill in the art would understand that in alternative implementations, disks can be selected for cooling based on other parameters. Furthermore, alternative embodiments contemplate that rather than cooling individual disks in the aggregate, cooling can be done at the granularity of RAID groups. As a result, all disks in a RAID group are placed in a cooling mode (as will be described below in reference to the "Disk Cooling Process").

A person of ordinary skill in the art would understand that although the present invention is described in the context of cooling disks with low access frequency, the underlying mechanism for reducing the disks' access frequency and pausing the disks with the reduced access frequency can be utilized with other desirable policies, such as pausing the disks that have a high access failure rate, etc. A person of ordinary skill in the art would also understand that this mechanism could be applied to disks with other power saving modes, such as disks whose rotational speed can be reduced.

B. Disk Cooling Process

Figure 3B:
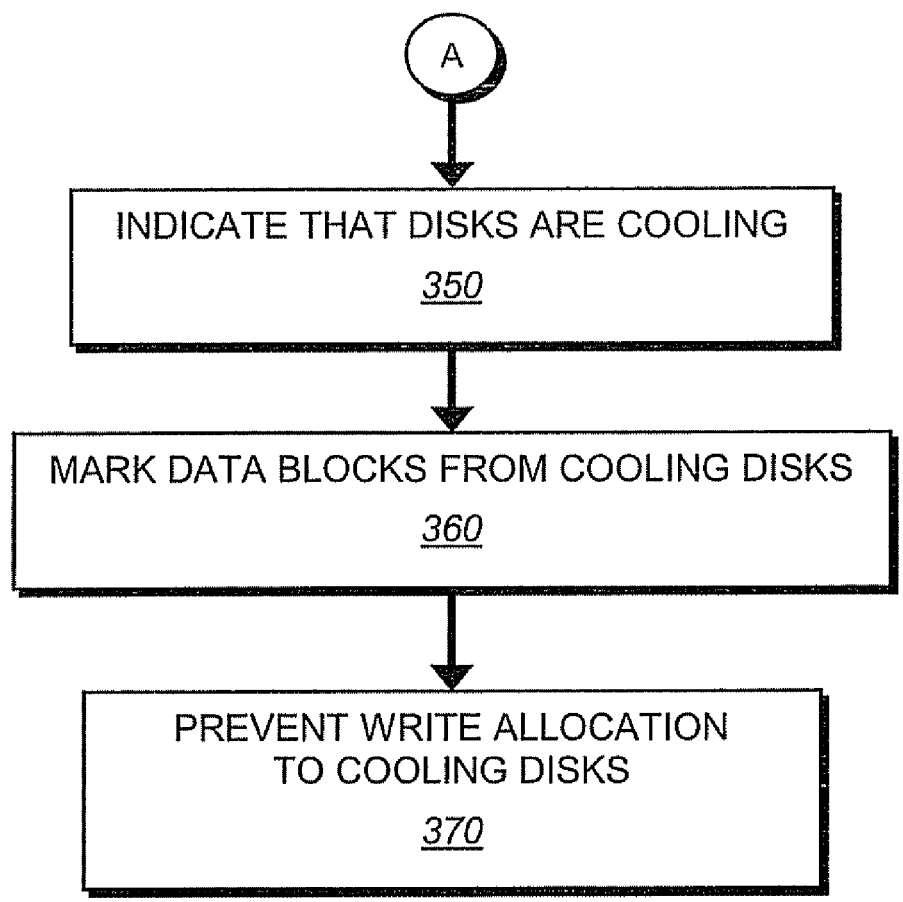
FIG. 3B is a flow diagram of the steps performed by a disk cooling module according to an embodiment of the present invention.

Referring now to FIG. 3B, it illustrates the steps performed by disk cooling module 284. Disk cooling module 284 receives from disk management system 240, IDs of the disks selected for cooling. Disk cooling module 284 records in a data structure (not shown in FIGS. 1-6) which disks are to be cooled (at step 350). Disk cooling module 284 uses the recorded information to determine whether a data block that is retrieved from a disk and stored in buffer cache 170 is from a cooling disk. If the retrieved data block is from the cooling disk, disk cooling module 284 sets a flag next to the data block to indicate that the data block should be written to new on-disk locations (step 360). In one implementation, disk cooling module 284 indicates that the retrieved data block is "dirty."

Furthermore, as part of the disk cooling process, the access frequency for the selected disks are reduced by suppressing write requests to the disks selected for cooling (step 370). To write data on a storage medium, such as on a disk, typically, the write allocation module 282 requests a free block on a disk to store data and then asks for a new disk from which to allocate data blocks. According to an embodiment of the present invention, to reduce access frequency to the cooling disks, the disk cooling module 284 prevents an ID of a cooling disk from being returned to the write allocation module 282 in response to the write allocation module 282 issuing a request for a disk to allocate data blocks. As described herein, write requests can be suppressed from going to individual disks or to an entire RAID group that includes selected disks.

C. Write Allocation Process

Figure 4:
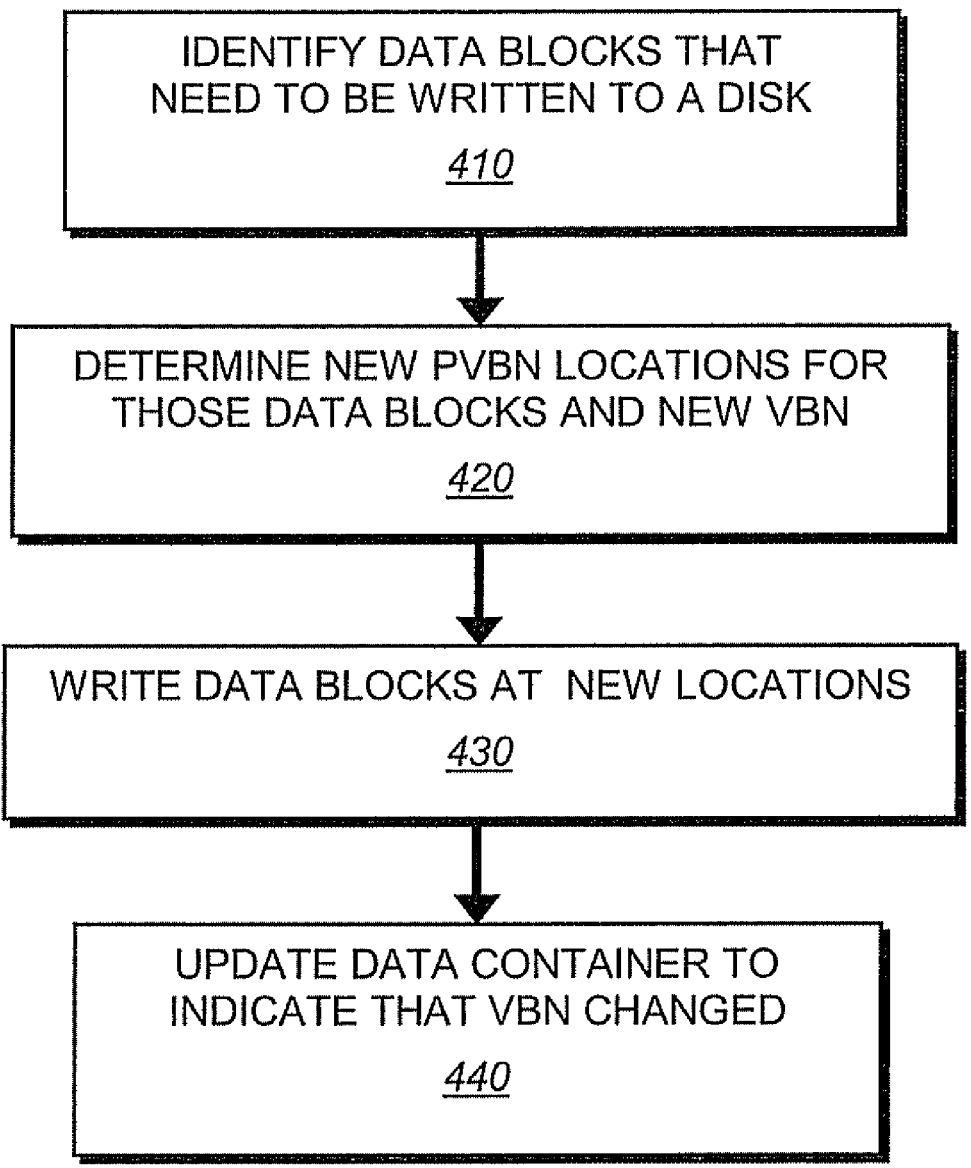
FIG. 4 is a flow diagram of the steps performed by a write allocation module according to an embodiment of the present invention.

Referring now to FIG. 4, it illustrates steps performed by write allocation module 282 when it writes data blocks from the cooling disk(s) at new locations. Write allocation module 282 periodically identifies data blocks marked as "dirty" within buffer cache 170 (step 410). At step 420, write allocation module 282 determines new on-disk locations (i.e., new PVBNs) for those blocks and writes the data blocks to new locations (step 430). As described herein, when write allocation module 282 requests a free block on a disk to store data, the ID of the cooling disk is not returned to the write allocation module in response to its request for a disk. As a result, new data are not written to a cooling disk.

The process then updates the block allocation data structure 286 (see FIG. 2) to reflect that the PVBNs corresponding to the new locations are now in use by the file system 280. A block to be moved will be considered dirty in VBN space (the aggregate) but not in VVBN space (the volume). Write allocation module 282 then updates VBN in a container buffer tree (step 440).

The process described in FIG. 4 occurs at each consistency point and is described in the context of moving data blocks to other locations as a result of servicing "normal read requests", e.g., requests initiated by the clients externally to the storage system that the system satisfies in order to provide data to its clients. A person of ordinary skill in the art would understand that FIG. 4 illustrates only those operations which relate to the technique introduced here and does not list every operation that may occur at a consistency point.

In other embodiments, data can be relocated during read requests initiated internally, for example, as part of the storage system's maintenance, such as during snapshot deletion to provide more available storage space. A snapshot is a persistent point in time (PPT) image of the active file system that enables quick recovery of data after data has been corrupted, lost, or altered. Snapshots can be created by copying the data at each predetermined point in time to form a consistent image, or virtually, by using a pointer to form the image of the data. A summary map of the file system (not shown in FIG. 2) indicates which blocks in the volume are used by snapshots. As a result of snapshot deletion, disk driver system 235 initiates internal read requests to read the summary map.

In an alternative embodiment, data blocks can be moved independently of client-initiated read operations during a background scan process initiated by RAID system 236. For example, disk cooling module 284 may select a segment of blocks on the disks caused to be cooled to relocate to other disks. A segment refers to a particular number of consecutive blocks across a disk in a RAID group (i.e., a "stripe" across a RAID group). Disk cooling module 284 then reads that segment from the RAID system 236 and determines (using their PVBNs) which blocks in the segment to relocate. The process then marks those blocks as "dirty", so that they will be relocated at the next consistency point. This can be done, for example, by setting an appropriate flag or a bit for each block to be moved.

D. Disk Pausing Process

Figure 3C:
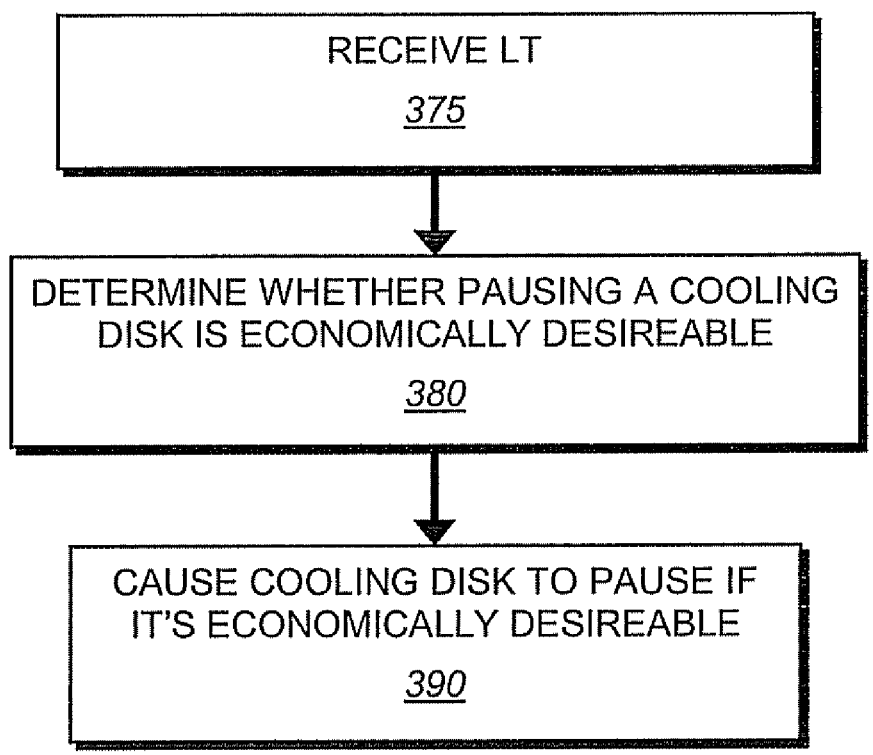
FIG. 3C is a flow diagram of the steps performed by a disk driver system shown in FIG. 2 to pause selected disks.

Referring now to FIG. 3C, it illustrates a process for pausing cooling disks. Disk driver system 235 periodically receives (at step 375) target latency ($L_T$) from monitoring module 260 and makes a determination whether it is economically desirable to pause a cooling disk(s) (step 380). To this end, in one implementation, disk driver system 235 compares access frequency for a cooling disk to a lower of the two parameters: spin down rate for the disk and $L_T$ (at step 380). A spin down rate can be coded into the system. To determine a spin down rate for a disk, the calculation takes into account the time it takes to pause and restart the disks. It also takes into account any energy and reliability costs for cycling disks in this manner. For example, a disk normally consumes energy E1 during the time T it takes to pause the disk, but it consumes 2*E1 if it is paused and then restarted. It would not save energy to pause such a disk until the average access time reached 2T, even if system latency targets were met. Similarly, if a policy is such that a disk could be paused and restarted only N times over a lifetime 1, if the access rate of a disk were higher than N/1, it would not be cost-effective to pause the disk.

If the disk access frequency is below the lower of the two parameters (spin down rate and target latency), disk driver system 235 causes the disk to pause (at step 390). Suppose the storage system 120 as a whole is processing N requests a second, at an average latency of Lcurrent avg. When the disk is paused, the latency of the requests sent to that disk will increase from approximately L to the time (S) it takes to restart the disk to serve the request. If the access frequency of the disk that will be paused is R, the total increase in latency will be S*R, and the increase in the average latency will be S*R/N. It will be cost-effective to pause the disk if the increase in the average latency remains less that the target latency, as shown by the equation below:

$$L_T > L + S*R/N$$

$$R < N*(L_T - L)/S$$

To pause a disk, disk driver system 235 sends a command to the disk to pause. The choice of the command depends on the type of disk. For example, disk driver system 235 may send a SCSI command "Stop" to pause a disk. The "Stop" command is also supported by FC and Serial Attached SCSI (SAS) drives. Disk's components that pause and restart the disk are described in more detail in reference to FIG. 5.

In an alternative embodiment, rather than comparing disk access frequency to the lower of the disk spin down rate and target latency of the aggregate, disk driver system 235 compares the access frequency to a spin down rate. If, as a result of the comparison, access frequency rate for a disk to be paused is above the spin down rate, the disk is not paused until the access frequency drops below the spin down rate for that disk. Once the access frequency drops below the spin down rate, disk driver system 235 pauses the disk.

Figure 5:
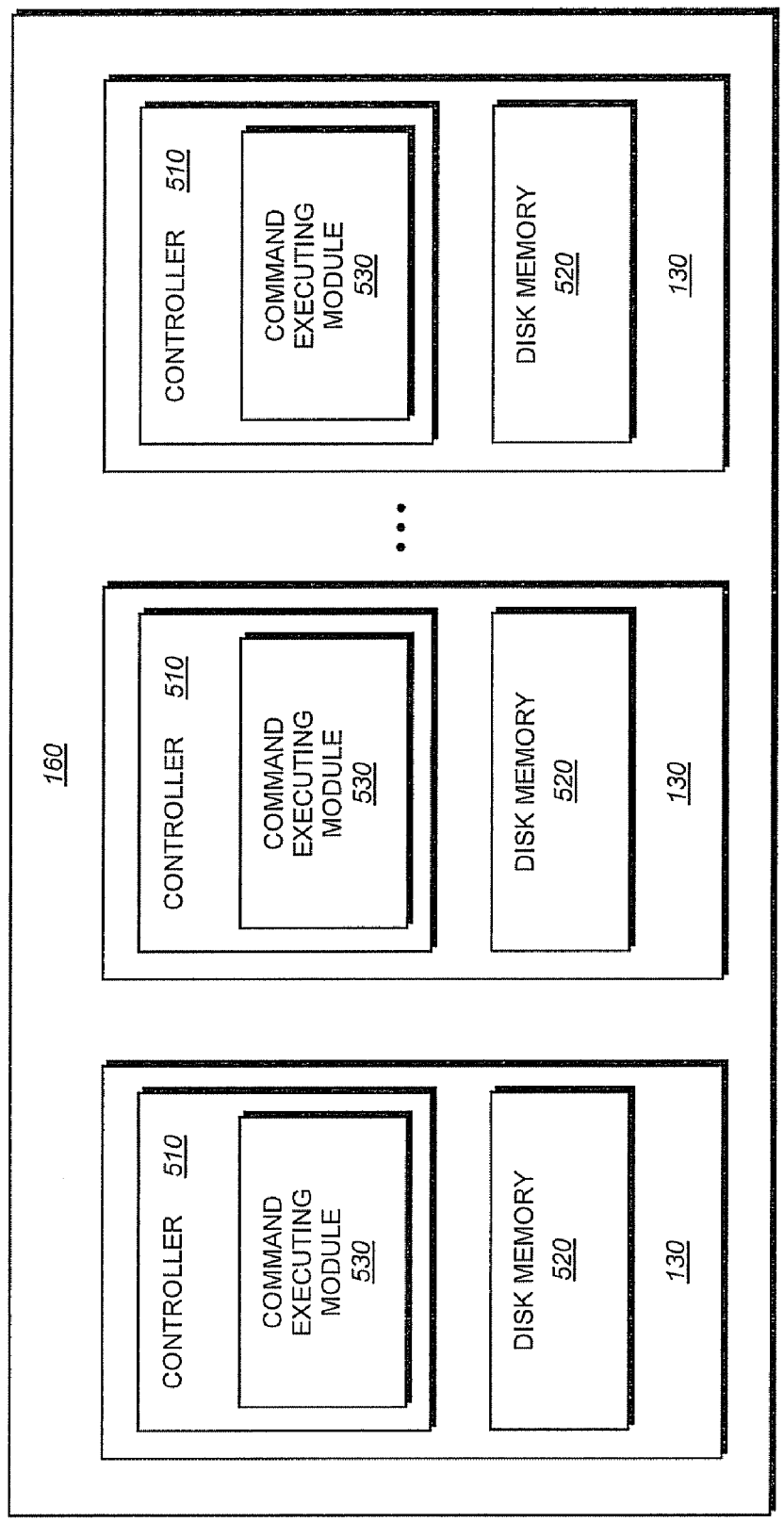
FIG. 5 is a diagram of components of a RAID group shown in FIG. 1.

Referring now to FIG. 5, it illustrates components residing on each disk 130 within a RAID group (such as RAID group 160 shown in FIG. 1). These components are configured to execute commands received from disk driver system 235. Disk 130 includes a disk memory 520 and a disk controller 510, which implements a command executing module 530. In a preferred embodiment, command executing module 530 is implemented as firmware embedded into a hardware device, such as controller 510. In another embodiment, command executing module 520 can be implemented as software stored in the disk memory 530. Command executing module 520 is configured to execute various commands received from disk driver system 235.

If a received command is, for example, a SCSI command "Stop", the disk will pause. As a result of the execution of the command at the disk, a spindle of the disk stops rotating, thereby reducing power consumption by the aggregate. When a disk is paused, commands that require accessing data on the disk, such as "read" and "write" commands, are not executed. When these commands are received by the disk, command executing module 520 returns an error indicating that it not ready to execute the command.

When a read request directed to a disk that has been paused arrives, disk driver system 235 sends a command to the disk to restart the disk so that the request can be served. In one implementation, such as command can be a "Start" command provided by SCSI.

As the storage system 120 continues to operate with a fewer number of disks after some disks have been paused, disk cooling module 284 continues cooling the disks that have been paused. Furthermore, monitoring module 280 periodically compares target latency with the current average latency for the aggregate. If the current average latency exceeds the target latency, monitoring module 280 causes the disks to be restarted again. If the current average latency still remains above the target latency after all the disks in the aggregate have been re-enabled, disk cooling module 284 re-enables write requests going the previously paused RAID group. In one implementation, when write allocation module 282 requests a disk to allocate data blocks, the ID of the cooling disk is provided to the write allocation module 282. Over time, re-enabling these previously cooled disks would increase the load on these disks and decrease the load on the remaining disks.

Thus, embodiments of the present invention provide various mechanisms for reducing access frequency of some disks in an aggregate by copying data blocks from those disks to other disks and causing the disks with the reduced access frequency to pause. Pausing selected disks in the aggregate advantageously reduces power consumption by the aggregate.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims. For example, the technique described herein can be used to change the number of requests to a disk by moving data blocks to other disks as they are read into a memory. As a result, the most frequently accessed data blocks are moved at a low cost.

Furthermore, a person of ordinary skill in the art would understand that parameters other than latency and utilization can be used to measure the system's performance in the context of the present invention. For example, a system administrator may specify target power consumption by an aggregate (in effect, specifying the number of disks to pause). The system would cool the disks with the goal of minimizing average latency under the power consumption constraint. In other embodiments, a user or an external policy engine that monitors performance of the storage system 120 may designate disk drives to cool.

In addition, although the present invention has been described in the context of causing the disks to pause in the primary storage (e.g., disks that store mission-critical data), a person of ordinary skill in the art would understand the present invention is also applicable to causing the disks to pause in archive systems, such as archive system 180 shown in FIG. 1. In this implementation, storage system prioritizes which disks to pause.

Moreover, the teachings of this invention can be adapted to a variety of storage system architectures including, but not limited to, a network-attached storage environment, and storage area network. The term "storage system" should therefore be taken broadly to include such arrangements in addition to any subsystems configured to perform a storage function and associated with other equipment or system.

Although the present invention is described using the file system, the RAID controller, and the disk driver system, those of skill in the art would understand that the invention can be practiced with other modules.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method performed by a storage system, having a processor, to pause disks in an aggregate, the method comprising:
   comparing current average latency of disks in the aggregate to a target latency of the aggregate;
   responsive to the target latency of the aggregate exceeding the current average latency, causing reduction of access frequency to selected disks in the aggregate;
   reducing a number of access requests received by the selected disks in the aggregate;
   comparing the access frequency of a disk of the selected disks to a lower of a spin down rate for the disk and the target latency of the aggregate; and
   responsive to the access frequency of the disk being less than the lower of the spin down rate for the disk and the target latency of the aggregate, pausing the disk of the selected disks having the reduced number of access requests.

2. The method of claim 1, wherein the selected disks are selected based on low access frequency.

3. The method of claim 1, wherein the selected disks are selected based on high access failure.

4. The method of claim 1, further comprising:
   preventing allocation of data blocks mapped to the selected disks; and
   writing data from the selected disks to new on-disk locations.

5. The method of claim 1, further comprising:
   receiving a read request for data stored on the selected disks;
   retrieving the data from the selected disks and providing an indication that the data is to be stored at new locations; and
   storing the data at the new locations.

6. The method of claim 5, wherein the data is stored at the new locations as a result of servicing read requests initiated by one or more clients.

7. The method of claim 5, wherein the data is stored at the new locations as a result of servicing read requests initiated by the storage system.

8. A method performed by a storage system, having a processor, to pause disks in an aggregate, the method comprising:
   comparing current average latency of disks in the aggregate to a target latency of the aggregate;
   responsive to the target latency of the aggregate exceeding the current average latency, causing reduction of access frequency to selected disks in the aggregate;
   comparing the access frequency for a disk of the selected disks to a lower of a spin down rate for the disk and the target latency of the aggregate; and
   responsive to the access frequency for the disk being less than the lower of the spin down rate for the disk and the target latency of the aggregate, pausing the disk of the selected disks.

9. The method of claim 8, wherein the selected disks are disks having low access frequency.

10. The method of claim 8, wherein causing reduction of access frequency further comprises:
    preventing allocation of data blocks mapped to the selected disks having low access frequency; and
    writing data directed to the selected disks to locations on other disks.

11. The method of claim 10, wherein the data is written to new locations as a result of servicing read requests initiated by one or more clients.

12. The method of claim 10, wherein the data is written to new locations as a result of servicing read requests initiated by the storage system.

13. The method of claim 8, further comprising restarting the disk that was paused upon receiving a read request addressed to the disk that was paused.

14. The method of claim 8, wherein the current average latency is computed based on a previous measured latency and a number of requests for which the current average latency is measured.

15. The method of claim 8, wherein the spin down rate of the disk is a maximum access frequency for the disk at which the disk can be paused.

16. The method of claim 8, wherein pausing the disk further comprises issuing a command to the disk to pause the disk.

17. A storage system, having a processor, the system comprising:
    a disk monitoring module configured to compare current average latency of disks in an aggregate to a target latency of the aggregate and, responsive to the target latency of the aggregate exceeding the current average latency, to request that some disks in the aggregate be cooled;
    a disk management module configured to receive a request, from the monitoring module, to select certain of the disks in the aggregate for cooling and to provide the selected disks for cooling;

a disk cooling module configured to provide an indication that data retrieved from a cooling disk in response to a read request be stored at a new location and to prevent a write request from going to the cooling disk;

a write allocation module configured to reallocate, at new locations, data blocks retrieved from the cooling disk; and a disk driver system configured to cause the cooling disk to be paused in response to an access frequency of the cooling disk being less than the lower of the target latency of the aggregate and a spin down rate of the cooling disk.

18. The storage system of claim 17, further comprising a command executing module executed at the cooling disk, configured to pause the cooling disk in response to a command received from the disk driver system.

19. The storage system of claim 18, wherein the command executing module comprises program code executed on one or more controllers at the cooling disk.

20. The storage system of claim 18, wherein the command executing module stops revolving a spindle in the cooling disk as a result of pausing the cooling disk.

21. The storage system of claim 17, wherein the disk cooling module and the disk monitoring module comprise program code executed on one or more processors of the storage system.

22. The storage system of claim 17, further comprising a memory structure for storing data retrieved from the cooling disk.

23. A non-transitory computer program product comprising:

computer readable medium containing executable program instructions executed by a processor, comprising:

program instructions that compare current average latency of disks in an aggregate to a target latency of the aggregate;

program instructions that cause reduction of access frequency to selected disks in the aggregate in response to the target latency of the aggregate exceeding the current average latency;

program instructions that compare the access frequency of a disk of the selected disks to a lower of a spin down rate for the disk and the target latency of the aggregate; and program instructions that pause the disk in response to the disk access frequency of the disk being less than the lower of the spin down rate for the disk and the target latency of the aggregate.

* * * * *

UNITED STATES PATENT AND TRADEMARK OFFICE
CERTIFICATE OF CORRECTION

| | | |
|---|---|---|
| PATENT NO. | : 8,312,214 B1 | Page 1 of 1 |
| APPLICATION NO. | : 11/692589 | |
| DATED | : November 13, 2012 | |
| INVENTOR(S) | : English | |

It is certified that error appears in the above-identified patent and that said Letters Patent is hereby corrected as shown below:

In the Specification
Col. 7, line 24 should read:
Represented in the write-anywhere file system as an ~~mode~~ inode data Col. 7, line 28 should read:
The buffer tree is known as an "~~mode~~inode" (602), which is a Col. 7, line 30 should read:
Information stored in the metadata section of each ~~mode~~ inode Col. 7, line 35 should read:
The data section of a regular on-disk ~~mode~~inode may include file Col. 7, line 38 should read:
~~Mode~~ inode and indirect block in the user buffer tree shown in FIG.

Col. 7, line 43 should read:
The block in the volume. Every ~~mode~~ inode and indirect block in the Col. 8, line 4 should read:
e.g., a "dirty" bit. After data in the ~~mode~~ inode (or block) is updated Col. 8, line 7 should read:
~~mode~~ inode (block) can be subsequently "flushed" (stored) to disk.

In the Claims
Col. 18, lines 4-5, Claim 23 should read:
A non-transitory computer ~~program product comprising: computer~~ readable medium containing executable pro- Signed and Sealed this
Eighteenth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,312,214 B1
APPLICATION NO. : 11/692589
DATED : November 13, 2012
INVENTOR(S) : English Page 1 of 1

It is certified that error appears in the above-identified patent and that said Letters Patent is hereby corrected as shown below:

In the Specification
In col. 10, line 55 should read:
Utilization ($P_{current}$) ~~fraction (P~~ represents a fraction of time Signed and Sealed this
First Day of July, 2014

Michelle K. Lee
*Deputy Director of the United States Patent and Trademark Office*